(12) United States Patent
Lampka

(10) Patent No.: US 11,620,144 B2
(45) Date of Patent: Apr. 4, 2023

(54) QUALIFYING A DEVICE DRIVER FOR A DEVICE

(71) Applicant: Elektrobit Automotive GmbH, Erlangen (DE)

(72) Inventor: Kai Lampka, Schwalbach a. Ts. (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 65 days.

(21) Appl. No.: 17/142,697

(22) Filed: Jan. 6, 2021

(65) Prior Publication Data

US 2021/0208909 A1    Jul. 8, 2021

(30) Foreign Application Priority Data

Jan. 8, 2020   (EP) .................................. 20150747

(51) Int. Cl.
*G06F 9/44*     (2018.01)
*G06F 9/455*    (2018.01)

(52) U.S. Cl.
CPC ...... *G06F 9/45504* (2013.01); *G06F 9/45533* (2013.01)

(58) Field of Classification Search
CPC .................................................. G06F 9/45504
USPC .......................................................... 703/23
See application file for complete search history.

(56) References Cited

U.S. PATENT DOCUMENTS

| | | | |
|---|---|---|---|
| 2007/0233509 A1 | 10/2007 | Buchman. et al. | |
| 2011/0246171 A1 | 10/2011 | Cleeton et al. | |
| 2016/0019105 A1 | 1/2016 | Makami et al. | |
| 2018/0203713 A1* | 7/2018 | Elfering | G06F 9/4411 |
| 2019/0121745 A1 | 4/2019 | Hoppert | |

FOREIGN PATENT DOCUMENTS

| | | |
|---|---|---|
| EP | 2597842 | 5/2013 |
| EP | 3021220 | 5/2016 |
| WO | WO 9966398 | 12/1999 |

OTHER PUBLICATIONS

Search Report of corresponding European Patent Application No. 20150747.
https://www.autosar.org.
https://en.wikipedia.org/wiki/Board_support_package.
https://www.jedec.org.
https://www.qemu.org.
https://www.elektrobit.com/products/ecu/eb-corbos/hypervisor/.
https://blackberry.qnx.com/de.
https://www.freertos.org/.
https://jenkins.io/.

* cited by examiner

*Primary Examiner* — Timothy A Mudrick
(74) *Attorney, Agent, or Firm* — Cozen O'Connor

(57) ABSTRACT

A method, a computer program containing instructions, and an apparatus for qualifying a device driver for a device. After a test environment is initiated, a test on the device driver is performed. This involves a device emulator emulating a behavior of the device under stipulated conditions. During the test, the device emulator performs an error injection or a test on at least one rarely occurring case.

15 Claims, 3 Drawing Sheets

QUALIFYING A DEVICE DRIVER FOR A DEVICE

BACKGROUND OF INVENTION

1. Field of the Invention

The present invention relates to a method, a computer program containing instructions, and an apparatus for qualifying a device driver for a device.

2. Description of Related Art

In many areas of application, it is necessary to check device drivers for robustness, i.e. to qualify the device drivers. This is often accomplished by following a hardware-in-the-loop test approach, in particular in the automotive industry. Hardware-in-the-loop in this instance denotes a method in which a system has its inputs and outputs connected to an adapted counterpart that is used as a replica of the real environment of the system. Part of the qualification is normally tests by error injection and tests on rarely occurring cases, known as corner cases. This requires electrical equipment, for example pulse generators, oscilloscopes or simulators for physical devices, to be used to provoke errors in the device for which the device driver is intended. Moreover, it may be necessary to operate the device under extreme conditions in a climatic chamber in order to allow tests on rarely occurring cases. A disadvantage of this approach is that it is necessary to have expensive equipment ready. Moreover, the tests are time-consuming.

SUMMARY OF THE INVENTION

It is an object of one aspect of the present invention to provide an improved solution for qualifying a device driver for a device.

Aspects of the invention are a method for qualifying a device driver for a device, a computer program containing instructions, and by an apparatus for qualifying a device driver for a device.

According to a first aspect of the invention, a method for qualifying a device driver for a device comprises:
performing a test on the device driver;
emulating a behavior of the device under stipulated conditions by means of a device emulator; and
performing an error injection or a test on at least one rarely occurring case by means of the device emulator.

According to a further aspect of the invention, a computer program comprises instructions that, when executed by a computer, prompt the computer to carry out the following for qualifying a device driver for a device:
performing a test on the device driver;
emulating a behavior of the device under stipulated conditions by means of a device emulator; and
performing an error injection or a test on at least one rarely occurring case by means of the device emulator.

The term computer should be understood in the broad sense in this case. In particular, it also includes workstations and other processor-based data-processing apparatuses.

The computer program can be provided for electronic retrieval or may be stored on a computer-readable storage medium, for example.

According to a further aspect of the invention, an apparatus for qualifying a device driver for a device has:
a test module, configured to perform a test on the device driver; and
a device emulator, configured to emulate a behavior of the device under stipulated conditions and to perform an error injection or a test on at least one rarely occurring case.

The solution according to one aspect of the invention involves device emulators that replicate dedicated devices or the device behavior being provided for the devices whose device drivers are intended to be qualified. These device emulators, which are implemented as executable files, can be used instead of the real hardware. They allow device behavior to be simulated that occurs on the real device only rarely under normal conditions. The device emulators therefore permit the behavior of the device driver to be tested under specific conditions and hence error injection tests and tests on rarely occurring cases to be supported without needing to perform tests using real hardware under extreme conditions, provided that this is actually possible. In the case of the solution according to the invention, effects on device timing and device functionality are simulated in the emulator, i.e. on the basis of an appropriate program, instead of being enforced by the environment or the electrical equipment. It is therefore possible to dispense with applicable electrical equipment or climatic chambers. The solution according to one aspect of the invention is therefore based purely on software. A further advantage is that significantly more tests can be performed in a shorter time, since the time response of the emulator modeled using software, e.g. the data processing, may be many times faster than that of the real device. Moreover, the method can be performed in automatable test cycles.

The approach described allows all of the necessary tests for qualifying the device drivers to be performed, as are used in MCALs (MCAL: Microcontroller Abstraction Layer), board support packages for Linux or operating systems for device control in general.

According to one aspect of the invention, the device emulator emulates a device behavior that is consistent with a standard usable for the device. The device emulators are designed such that the devices behave in compliance with the standard, i.e. as provided for in the standard usable for the device. An example of such a standard is JEDEC 5.1. Since the actual devices need to meet the requirements of the respective standard, such an approach is adequate for emulating the behavior of a real device. However, one occurrence may be that during later use of the device driver a device does not behave as it did during the tests, e.g. because the device overheats during real use, which was not part of the test in the laboratory. Such divergences from the standard-compliant behavior are then to the detriment of the device supplier, however, and are not the responsibility of the device driver.

According to one aspect of the invention, the device emulator emulates effects of environmental influences on the device. Besides error injection tests and tests on rarely occurring cases, the device emulator can be used to quite generally emulate the device behavior under changing environmental conditions, e.g. at different ambient temperatures. In this way, the device driver can be qualified for the entire specified operating range of the device.

According to one aspect of the invention, the device emulator is part of a virtualization environment. The virtualization environment may be a hypervisor, for example. A further aspect of the solution according to the invention besides the use of device emulators is a suitable virtualization environment, as provided by QEMU or by EB corbos Hypervisor, for example. The solution according to one aspect of the invention allows hypervisor-based processor virtualization and device emulation to be combined. Qualification tests are performed in the form of software-in-the-loop tests in this way.

According to one aspect of the invention, the virtualization environment makes an association between virtual addresses and physical addresses. Virtualization environments allow the association of virtual addresses with physical addresses to be manipulated transparently and hence allow the device driver to be transparently associated with the device emulator. It therefore remains hidden from the device driver that it is coupled to another software component and is not communicating with the real device or with a software component. Put another way, the input/output memory is used not by the device, which has its input/output memory at a fixed address, but rather by the emulator. The device emulator in turn can return any desired error state on receiving operating sequences of the device driver.

The aim of the above illustration is for the device driver that is to be tested to be embedded as a general rule in an operating system, such as Linux, QNX, Autosar OS, FreeRTOS, etc., or directly in the virtualization environment. According to one aspect of the invention, the device driver does not necessarily have to be a direct part of the virtualization environment that contains the emulator. The device driver can also be operated externally, for example as part of one of the aforementioned operating systems. This should be the same during and outside the test mode. This software external to the virtualization environment, with or without an operating system of its own, can then even be integrated in the virtualization environment. The device driver in this case is referred to as being part of what is known as a guest operating system and considered part of what is known as a virtual machine, with a virtual machine as a container object for the purposes of a virtualization environment.

Alternatively, the device driver and possibly its operating system can also be operated outside the virtualization environment. In contrast to the approach described above, the device driver and its associated operating system are in this instance executed on computing units that are not under the control of the virtualization environment. For this "bare metal mode" of the device driver or its operating system, these and the virtualization environment need to be appropriately configured, however, so that the joint input/output memory and the signals to be used are unambiguous and concordant.

In the text that follows, the depiction of the solution according to the invention concentrates on the first approach, however, i.e. the device driver is part of a virtual machine or directly integrated in the virtualization environment, just as provided for by later use after qualification. The approach of external operation needs to be handled accordingly analogously.

According to one aspect of the invention, the device driver is embedded directly in the virtualization environment. The device driver does not necessarily have to be part of a virtual machine, for example a guest operating system. Should the device to be operated be used by multiple guest operating systems at the same time, and if the device itself has no virtualization support, then it is necessary for the virtualization function to be performed using software. The actual device access in this instance is provided by the device driver embedded in the virtualization layer. This requires the virtual machines and the guest operating systems thereof, by contrast, to use a device driver appropriately geared to the virtualization layer. Such drivers are referred to as virtualization-compatible device drivers below.

The test setup with virtualization-compatible drivers therefore comprises not only the qualification of the original device driver, that is to say the driver that actually actuates the physical device, but also the testing of the virtualization-compatible device drivers in the virtual machines and the counterpart thereof in the virtualization layer.

According to one aspect of the invention, the device emulator serves as a front end for the emulated device. This approach has the advantage that for example booting the system is facilitated, in particular booting a guest operating system, since the time response of the emulator modeled using software may be many times faster than that of the real device.

Further features of the present invention will become apparent from the description that follows and the appended claims in conjunction with the figures.

DETAILED DESCRIPTION OF THE PRESENTLY PREFERRED EMBODIMENTS

For a better understanding of the principles of the present invention, embodiments of the invention will be described below in more detail with reference to the figures. The same reference signs are used in the figures for identical or functionally identical elements and are not necessarily described again for each figure. The invention is not restricted to the illustrated embodiments and that the described features may also be combined or modified without departing from the scope of protection of the invention as defined in the accompanying claims.

Figure 1:
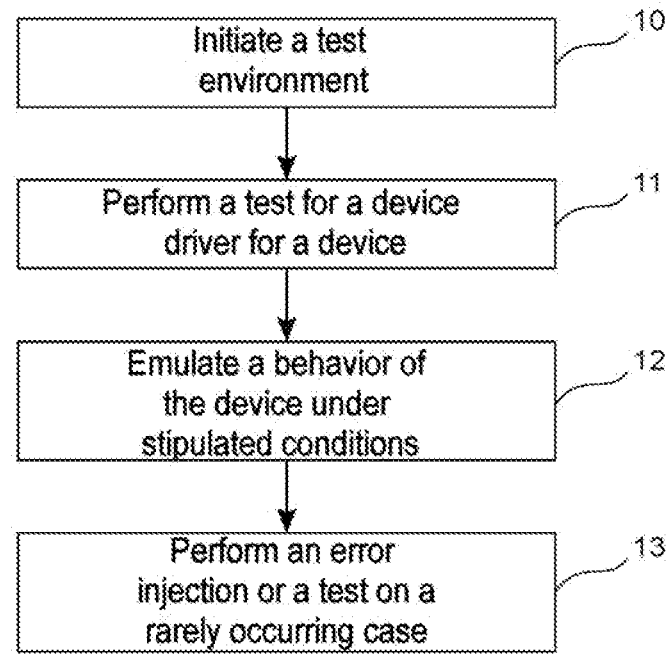
FIG. 1 is a flowchart of a method for qualifying a device driver for a device.

FIG. 1 schematically shows a method for qualifying a device driver for a device. After a test environment is initiated 10, a test on the device driver is performed 11. This involves a device emulator emulating 12 a behavior of the device under stipulated conditions. Preferably, a device behavior that is consistent with a standard usable for the device is emulated 12. In particular, effects of environmental influences on the device can also be emulated. During the test, the device emulator performs 13 an error injection or a test on at least one rarely occurring case. The device emulator may be part of a virtualization environment, e.g. a hypervisor. The virtualization environment makes an association between virtual addresses and physical addresses. The device emulator can also serve as a front end for the emulated device. The device driver may be part of the virtualization environment or integrated in a guest operating system that is executed in the virtualization environment.

According to the embodiments above, the software component of a test system consists of device drivers, device emulator, virtualization layer, for example in the form of a hypervisor, the applications of the virtualization layer, and possibly one or more guest operating systems.

Figure 2:
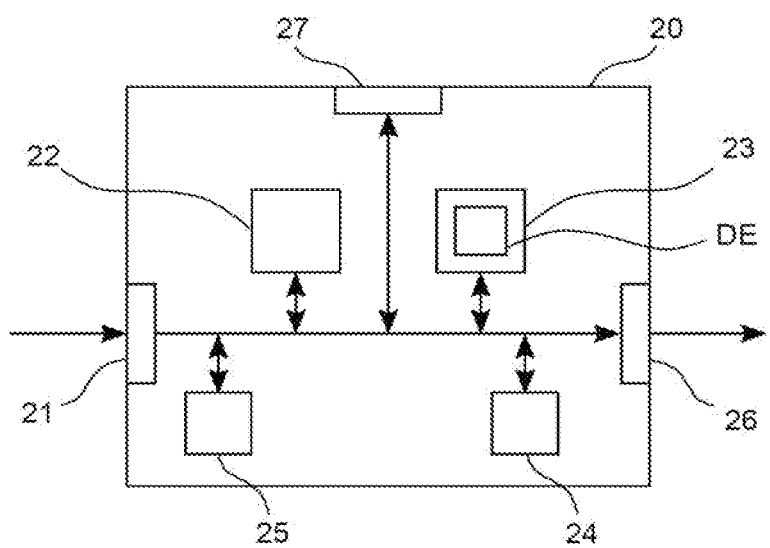
FIG. 2 is an apparatus for qualifying a device driver for a device.

FIG. 2 shows a simplified schematic depiction of a first embodiment of an apparatus 20 for qualifying a device driver for a device. The apparatus 20 has an input 21 via which data can be received, e.g. the device driver to be qualified. A test module 22 is configured to perform a test on the device driver. A device emulator DE is configured to emulate a behavior of the device under stipulated conditions and to perform an error injection or a test on at least one rarely occurring case during the test. Preferably, the device emulator DE is configured to emulate a device behavior that is consistent with a standard usable for the device. In particular, effects of environmental influences on the device can also be emulated by the device emulator DE. The device emulator DE can run on a processor 23, for example. It may in particular be part of a virtualization environment, e.g. a hypervisor. The virtualization environment makes an association between virtual addresses and physical addresses. The device emulator DE can also serve as a front end for the emulated device. The device driver may also be part of the virtualization environment. The ascertained test results can be output via an output 26 of the apparatus 20.

The test module 22 and the processor 23 can be controlled by a control unit 24. Settings for the test module 22, the processor 23 or the control unit 24 can be altered, if need be, via a user interface 27. The data that accrue in the apparatus 20 may be stored in a memory 25 of the apparatus 20 if necessary, for example for later evaluation or for use by the components of the apparatus 20. The test module 22, the processor 23, and the control unit 24 may be realized as dedicated hardware, for example as integrated circuits. Naturally, they may also be partially or completely combined, however, for example in a GPU or a CPU. The input 21 and the output 26 may be implemented as separate interfaces or as a combined bidirectional interface.

Figure 3:
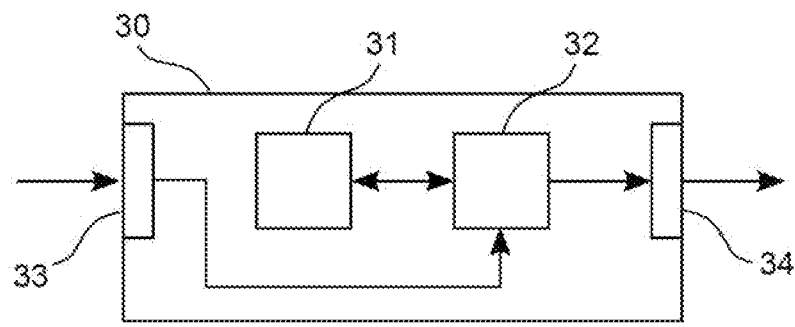
FIG. 3 is an apparatus for qualifying a device driver for a device.

FIG. 3 shows a simplified schematic depiction of a second embodiment of an apparatus 30 for qualifying a device driver for a device. The apparatus 30 has a processor 32 and a memory 31. The apparatus 30 is a computer or a graphics chip, for example. The memory 31 stores instructions that, when executed by the processor 32, prompt the apparatus 30 to carry out the steps according to one of the described methods. The instructions stored in the memory 31 thus embody a program that is able to be executed by the processor 32 and that performs the method according to one aspect of the invention. The apparatus 30 has an input 33 for receiving information. Data generated by the processor 32 are provided via an output 34. These data may also be stored in the memory 31. The input 33 and the output 34 may be combined to form a bidirectional interface.

The processor 32 can comprise one or more processor units, for example microprocessors, digital signal processors or combinations thereof.

The memories 25, 31 of the described apparatuses may contain both volatile and nonvolatile memory areas and may comprise a wide variety of storage devices and storage media, for example hard disks, optical storage media or semiconductor memories.

FIG. 2 and FIG. 3 convey a black box view of the test system, i.e. the specific design of the software component of the test system is abstracted here.

Figure 4:
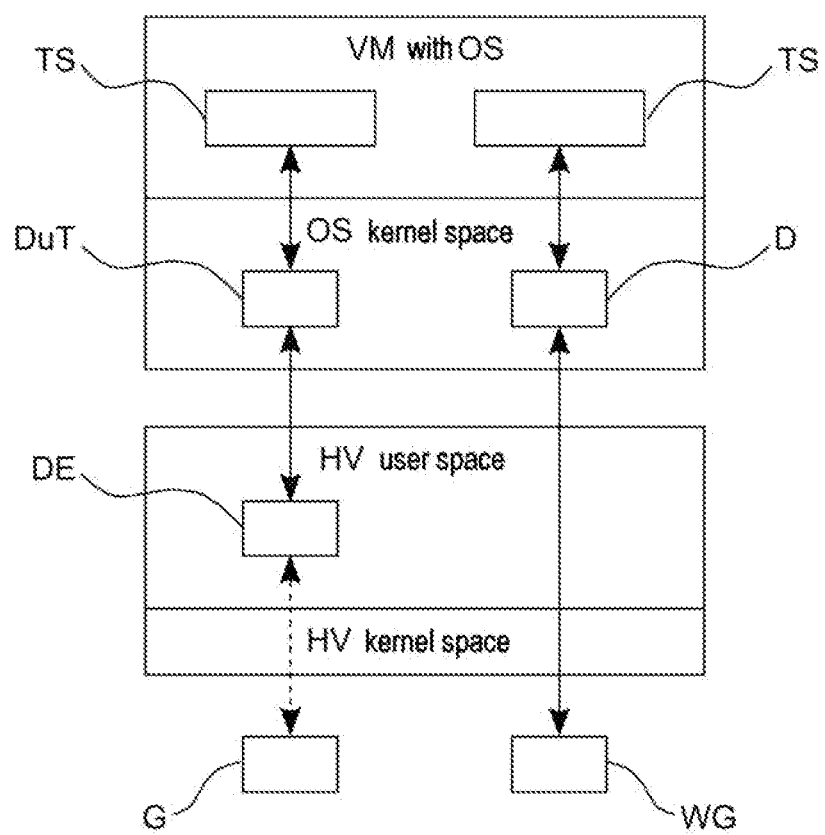
FIG. 4 is a device driver that is part of a guest operating system.
Figure 5:
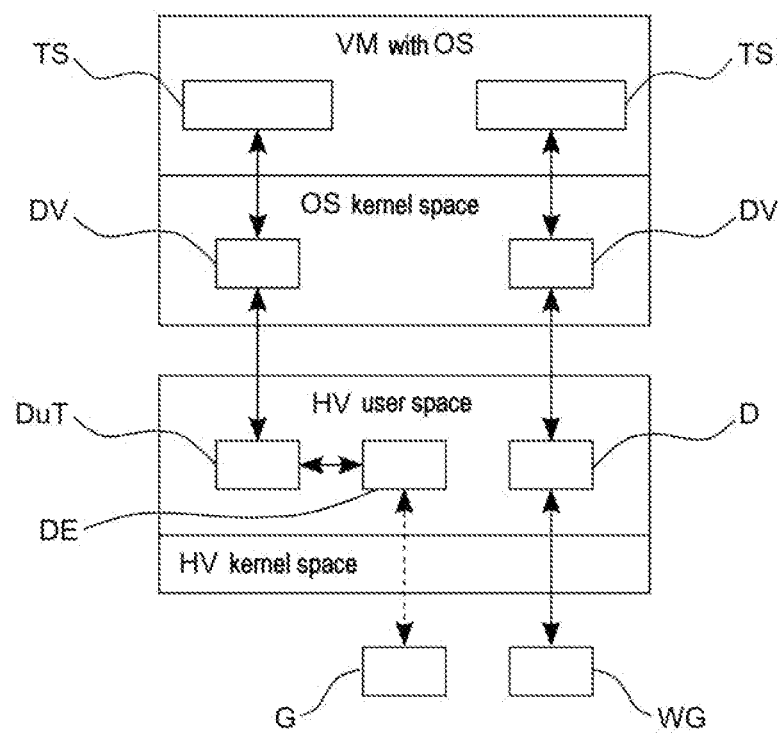
FIG. 5 is a device driver that is part of a virtualization environment.

FIG. 4 and FIG. 5 are concerned with the specific design of the software component of the test system, consisting of device drivers, device emulator, virtualization layer, for example in the form of a hypervisor, the applications of the virtualization layer, possibly one or more guest operating systems and possibly the virtualization-compatible device drivers thereof.

FIG. 4 shows an embodiment of the solution according to the invention, in which the device driver DuT is part of a guest operating system OS that runs in a virtual machine VM on a virtualization layer. The guest operating system OS executes a test script TS. The device driver DuT to be qualified runs in the address space of the guest operating system OS, i.e. in the area of the main memory that is reserved for the guest by the virtualization environment. Further device drivers D for nonvirtualized further devices WG that are not the subject of the qualification can also run there. The solution according to one aspect of the invention is not restricted to completely virtualized operating systems. That is to say that the guest can also run on its own hardware besides the virtualization layer and can communicate with the latter via memory and signals.

FIG. 4 shows the general case in which the device driver DuT is part of the core or kernel of the guest operating system OS and therefore runs in the kernel space of the guest. The solution according to the invention therefore also relates to setups in which the device driver DuT is also executed in what is known as the user space of the guest operating system, this not being addressed explicitly below, but also being able to be assumed.

The device emulator DE for the device driver DuT to be qualified is part of a virtualization environment HV, in this example a hypervisor, and therefore runs in the address area of the guest operating system OS that is provided by the virtualization environment HV. The depiction again illustrates a common case in which the emulator DE is executed in its own address space as part of the user address space. As in the case of the guest operating system OS, it is possible in this case too for the device emulator DE to be embedded in the address space of the core of the virtualization environment HV, the HV kernel space. The depiction can be looked at analogously to the above and is dependent on the virtualization environment HV used. The case in which the emulator DE is executed within the address space of the virtualization environment HV is not addressed explicitly below, but can be assumed as an alternative.

For all device WG and device driver D pairs that are not tested, the devices WG can be mapped directly to the applicable address space of the guest operating system OS, this also being referred to as a device passthrough. A device passthrough involves the devices WG effectively being passed through to the guest. For these further devices WG, the behavior is practically as if the virtualization environment HV or the hypervisor were not present, apart from interrupt handling.

For the device driver DuT that is to be qualified, on the other hand, the device emulator DE is mapped to the address space of the guest operating system OS, i.e. the guest and the emulator DE communicate via the one joint input/output memory. This permits the device behavior that is to be expected or else for example errors to be easily injected. The device emulator DE either models the complete behavior of the physical device G or serves as a front end for the applicable device G.

Combining the emulator DE and the device G is useful if the emulator DE does not cover the complete spectrum of behavior of the device G or the device G needs to return data that are significant for the system behavior, for example program data needed during the boot process of the guest operating system OS or complex computation results that cannot be produced by the emulator DE, etc.

FIG. 5 shows an embodiment of the solution according to the invention, in which the device driver DuT to be qualified is part of the virtualization environment. The setup is otherwise analogous to that from FIG. 4 and the device emulator DE can serve as a front end for the device G or completely simulate the behavior thereof in this case too. As previously, the device emulator DE can be mapped to the address space of the device driver, and errors can be injected by the device emulator DE. In contrast to FIG. 4, in this instance a virtualization-compatible device driver DV runs in the guest operating system and the counterpart thereof, including the real device driver DuT, runs in the user space of the virtualization environment HV. It is therefore possible for the device driver of the virtualization environment itself to be tested against the emulator DE and for realistic use behavior of the device G to be simulated from the guest operating system OS.

In principle, this setup is used to test device drivers that assume that they have the device G physically in front of them, device drivers DuT and device drivers DV that have appropriate virtualization support available specifically for use in guest operating systems. The latter device drivers DV have already been introduced as virtualization-compatible device drivers DV above. Using the virtualized driver DV in the virtual machine has the advantage that this allows the device use from above to be simulated by software as in real operation, that is to say allows real instances of application of the device G to be used.

FIG. 4 and FIG. 5 therefore show two examples of a test setup that involve the device driver to be tested being incorporated at different points. In principle, however, it is irrelevant to the solution according to one aspect of the invention whether the device driver is executed in the virtual machine as part of a core of a guest operating system, as part of the user space thereof or in the virtualization environment. It is also irrelevant whether the device driver, when incorporated in the virtualization environment, is executed in the core thereof or the user space thereof.

Besides the classes of use depicted in FIG. 4 and FIG. 5, a further class can be distinguished. This class addresses the use of devices that themselves have integral virtualization support available. An example of these is GPUs or other computation accelerators implemented using hardware. In this case, the device driver in the guest operating system is designed such that it can use the device independently and at the same time as other guest operating systems. It is the device itself that can handle multiple clients. From the point of view of the device driver in the guest operating system, it therefore looks as if the device is used exclusively by it. In this case too, it looks to the device driver as if it has the physical device in front of it. It is therefore possible for the device driver to be tested against the emulator in this case too, because here too the device driver ultimately only ever accesses the input/output memory assigned to it. Whether said input/output memory is now used by the real device or the emulator is also transparent here. This setup therefore also permits device drivers that were implemented for devices with integral virtualization support to be tested. It is irrelevant to the emulator; the emulator works against the one device driver regardless of whether said device driver was implemented for devices with or without virtualization support and regardless of whether the device driver was embedded in the guest operating system or directly in the virtualization layer.

Figure 6:
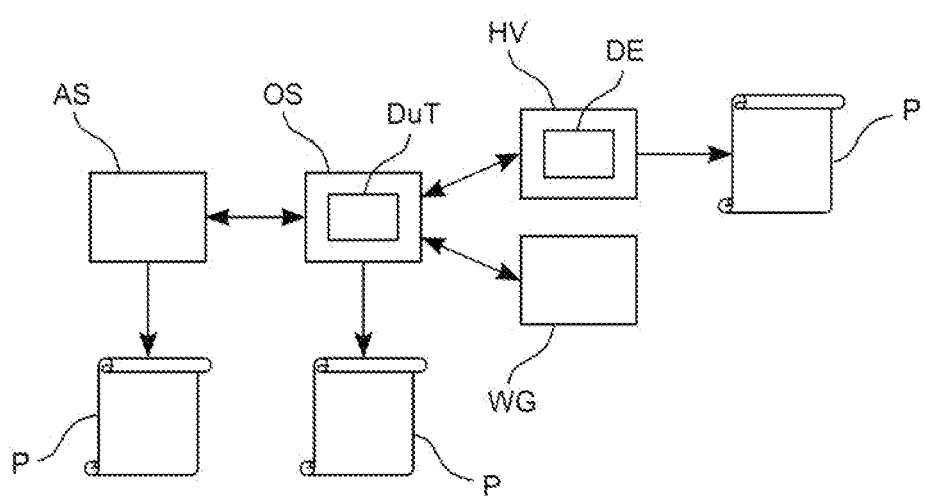
FIG. 6 is a diagram of qualification of a device driver for a device.

FIG. 6 shows a diagram of qualification of a device driver for a device, according to the invention. The device driver DuT in this instance is part of an operating system or guest operating system OS. The device emulator DE and the error injection tests or test scenarios are implemented in the virtualization environment HV. The virtualization environment HV and the guest operating system OS are configured such that the device for which the device driver DuT is intended to be qualified and the device emulator DE are mapped to the same physical addresses. For any other devices WG in the guest operating system, a device passthrough can take place. Alternatively, it is also possible for emulations to be performed by other devices, however. In the depiction, it is irrelevant whether the guest operating system OS is part of the virtualization environment HV or is operated in bare metal mode on its own computing units, which are not controlled by the virtualization environment HV.

A test environment in the form of a piece of application software AS is provided for automating the tests, e.g. as part of Jenkins [8], etc. During the tests, logs P of the test passes can be created both by the application software AS and by the operating system OS and the virtualization environment HV, said logs being able to be evaluated following the conclusion of the tests. The diagram from FIG. 6 can naturally also be used without the device emulator DE in order to subject the device itself to a stress test. The tests themselves can be executed as a script on the guest operating system OS, e.g. as use profiles. The desired behavior being emulated, for example an abnormal behavior or a positive behavior, is stored and implemented in the emulator DE. Conversely, when using an emulator DE, it is not necessary for a device G to actually be present. In this regard, the emulator DE needs to be able to reproduce the entire input/output behavior of the device G. If both the device G and the emulator DE are used, a hybrid form can be implemented, which may likewise be advantageous.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for qualifying a device driver for a device, comprising:
   performing a test on the device driver;
   emulating a behavior of the device under stipulated conditions by a device emulator; and
   performing a test on at least one corner case by the device emulator,
   wherein the device emulator emulates effects of environmental conditions on the device.

2. The method as claimed in claim 1, wherein the device emulator emulates a device behavior that is consistent with a standard usage for the device.

3. The method as claimed in claim 1, wherein the device emulator is part of a virtualization environment.

4. The method as claimed in claim 3, wherein the virtualization environment makes an association between virtual addresses and physical addresses.

5. The method as claimed in claim 4, wherein the virtualization environment is a hypervisor.

6. The method as claimed in claim 5, wherein the device driver is a direct part of the virtualization environment.

7. The method as claimed in claim 3, wherein the device driver is integrated in the virtualization environment as part of a virtual machine.

8. The method as claimed in claim 3, wherein the device driver is operated independently of the virtualization environment.

9. The method as claimed in claim 1, wherein the device emulator serves as a front end for the emulated device.

10. A computer program product stored on a non-transitory computer readable storage medium containing instructions that, when executed by a computer, prompts the computer to carry out the steps of a method for qualifying a device driver, comprising:
    performing a test on the device driver;
    emulating a behavior of the device under stipulated conditions by a device emulator; and
    performing a test on at least one corner case by the device emulator,
    wherein the device emulator emulates effects of environmental conditions on the device.

11. An apparatus for qualifying a device driver for a device, having:
    a test module, configured to perform a test on the device driver; and
    a device emulator, configured to emulate a behavior of the device under stipulated conditions and to perform a test on at least one corner case,
    wherein the device emulator emulates effects of environmental conditions on the device.

12. The method as claimed in claim 1, further comprising:
    performing an error injection by the device emulator.

13. The computer program product according to claim 10, further comprising prompting the computer to qualifying a device driver, comprising:
    performing an error injection by the device emulator.

14. The apparatus for qualifying according to claim 11, wherein the device emulator is further configured to emulate the behavior of the device under stipulated conditions and to perform an error injection.

15. The method as claimed in claim 1, wherein environmental conditions include different ambient temperatures.

* * * * *